United States Patent
He et al.

(10) Patent No.: US 11,895,747 B2
(45) Date of Patent: Feb. 6, 2024

(54) ILLUMINATION DEVICE, LED DRIVER CIRCUIT, BLEEDER CONTROL CIRCUIT AND CONTROL METHOD

(71) Applicant: Joulwatt Technology Co., Ltd., Hangzhou (CN)

(72) Inventors: Wanyue He, Hangzhou (CN); Guoqiang Liu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/981,374

(22) Filed: Nov. 4, 2022

(65) Prior Publication Data

US 2023/0137757 A1    May 4, 2023

(30) Foreign Application Priority Data

Nov. 4, 2021 (CN) .......................... 202111301729.9

(51) Int. Cl.
*H05B 45/30* (2020.01)
*H05B 45/31* (2020.01)
*H05B 45/14* (2020.01)

(52) U.S. Cl.
CPC ............. *H05B 45/31* (2020.01); *H05B 45/14* (2020.01)

(58) Field of Classification Search
CPC ...... H05B 45/10; H05B 45/14; H05B 45/325; H05B 45/355; H05B 45/385; H05B 45/3575
See application file for complete search history.

(56) References Cited

U.S. PATENT DOCUMENTS

| | | | | |
|---|---|---|---|---|
| 8,922,129 B1* | 12/2014 | Rodriguez | ......... | H05B 45/3725 315/307 |
| 9,282,606 B1* | 3/2016 | Kuang | .................. | H05B 45/14 |
| 11,071,179 B2* | 7/2021 | Mu | ..................... | H05B 45/3575 |
| 11,382,196 B2* | 7/2022 | Sun | ......................... | H05B 45/30 |
| 2015/0366019 A1* | 12/2015 | Kuang | ................... | H05B 45/10 315/206 |
| 2018/0042082 A1* | 2/2018 | Tu | ........................... | H05B 45/48 |
| 2019/0150240 A1* | 5/2019 | Yu | .......................... | G01R 31/44 315/200 R |
| 2020/0154541 A1* | 5/2020 | Mu | ........................ | H05B 45/14 |

* cited by examiner

*Primary Examiner* — Tung X Le
(74) *Attorney, Agent, or Firm* — Bayramoglu Law Offices LLC (57) ABSTRACT

An illumination device, an LED driver circuit, a bleeder control circuit and a control method are provided. An AC input voltage is transmitted to a bus line after phase-cut processing. The bleeder control circuit includes a timing module configured to receive a bus voltage and at least one threshold voltage and generate a first time signal; a time processing module configured to receive the first time signal and generate a second time signal based on the first time signal in a previous power frequency half-wave cycle; and a control signal generation module configured to receive the second time signal and generate a first control signal for controlling a bleeder circuit. The beneficial effects of the present disclosure include the bleeder circuit being accurately controlled through the detection of the bus voltage and the implementation of the adaptive control method, thereby improving the operational efficiency and stability of the system.

19 Claims, 7 Drawing Sheets

ILLUMINATION DEVICE, LED DRIVER CIRCUIT, BLEEDER CONTROL CIRCUIT AND CONTROL METHOD

CROSS REFERENCE OF THE RELATED APPLICATION

The present invention is based on and claims foreign priority to Chinese patent application No. 202111301729.9 filed Nov. 4, 2021, the entire content of which is incorporated herein by reference.

TECHNICAL FIELD

The present disclosure relates to the field of illumination devices and in particular to an illumination device, a light-emitting diode (LED) driver circuit, a bleeder control circuit, and a control method.

BACKGROUND

Phase-cut dimming means chopping an input voltage via a dimmer, and silicon controlled dimming is a commonly used method for forward phase-cut dimming. A silicon controlled dimmer (also known as a triode for alternating current (TRIAC)) realizes dimming through phase control. Specifically, in each half cycle of the sine wave of the alternating current (AC), the silicon controlled dimmer is controlled to be conducting to obtain the same conduction angle (i.e., the conduction time of the silicon controlled dimmer in each half cycle of the sine wave). By adjusting the chopper phase of the silicon controlled dimmer, the conduction angle of the TRIAC can be changed to realize dimming. Reverse phase-cut dimming is commonly achieved by using fully controlled power devices such as a Metal-Oxide-Semiconductor Field-Effect Transistor (MOSFET)/Insulated Gate Bipolar Transistor (IGBT), which are used to chop the input voltage to realize dimming.

When silicon controlled dimmers or fully controlled power devices such as the MOSFET/IGBT are used for phase-cut dimming because the back-end circuit is in a high-impedance state after the dimmer turns off, a bus voltage cannot drop. To ensure normal operation of the dimmer, a bleeder current circuit needs to be added to the circuit to ensure normal conduction of the dimmer and stable operation of the circuit. Currently, bleeder control mainly includes two methods. One method is always enabling the bleeder circuit. When the bleeder current always exists, the circuit loss is higher and the efficiency is reduced, and device heating easily affects the device's life. The other method is monitoring in real time a specified voltage threshold at the falling edge and enabling the bleeder circuit when the specified threshold is reached. In the dimming process, this method cannot quickly respond to the dimming phase angle changes. Consequently, the holding current in the circuit has an impact on the circuit, reducing the operational efficiency and stability of the system.

Therefore, it is necessary to provide an improved technical solution to overcome the above technical problems in the prior art.

SUMMARY

To overcome the above-mentioned defects in the prior art, the purpose of this application is to provide an illumination device, an LED driver circuit, a bleeder control circuit, and a control method to adaptively control the on/off a bleeder circuit.

Based on the above inventive purpose, the present disclosure provides a bleeder control circuit, where an AC input voltage is transmitted to a bus line after phase-cut processing, and the bleeder control circuit includes:
  a timing module configured to receive a bus voltage and at least one threshold voltage and generate a first time signal characterizing a time between a moment at which a rising edge of the bus voltage reaches the threshold voltage and a moment at which a falling edge reaches the threshold voltage during each power frequency half-wave cycle;
  a time processing module configured to receive the first time signal and generate a second time signal based on the first time signal in a previous power frequency half-wave cycle; and
  a control signal generation module configured to receive the second time signal and generate a first control signal for controlling a bleeder circuit.

Further, at least one threshold voltage may include a first threshold voltage and a second threshold voltage, and the timing module generates the first time signal characterizing the time between the moment at which the rising edge of the bus voltage reaches the first threshold voltage and the moment at which the falling edge reaches the second threshold voltage.

Further, the time processing module is configured to receive the first time signal to store as the second time signal; and
  detect the bus voltage and output the second time signal when detecting that the bus voltage reaches the threshold voltage.

Further, the timing module may include:
  a first comparator configured to receive the bus voltage and the first threshold voltage and output a first signal when detecting that the rising edge of the bus voltage reaches the first threshold voltage during each power frequency half-wave cycle;
  a second comparator configured to receive the bus voltage and the second threshold voltage and output a second signal when detecting that the falling edge of the bus voltage reaches the second threshold voltage during each power frequency half-wave cycle; and
  a detection module configured to receive the first signal and the second signal, detect a time between the adjacent first signal and second signal and generate the first time signal.

Further, the time processing module may include:
  a first storage module configured to receive the first time signal in the previous power frequency half-wave cycle to store as the second time signal;
  a first comparison module configured to receive the first time signal and the second time signal in the same power frequency half-wave cycle and output a third signal when the first time signal is not equal to the second time signal;
  a first processing module configured to receive the third signal and increase the second time signal by a step in the next power frequency half-wave cycle; and
  a first timing module configured to receive the bus voltage, the first threshold voltage, and the second time signal, and output the second time signal when the rising edge of the bus voltage reaches the first threshold voltage.

Further, the time processing module may include:

a second storage module configured to receive the first time signal in the previous power frequency half-wave cycle to store as the second time signal;

a second comparison module configured to receive the first time signal and the second time signal in the same power frequency half-wave cycle and compare the first time signal with the second time signal to obtain a third time signal;

a second processing module configured to receive the third time signal and compare the third time signal with a first predetermined time, and increase the second time signal by a step in a next power frequency half-wave cycle when the third time signal is smaller than the first predetermined time and greater than a second predetermined time, or decrease the second time signal by a step in a next power frequency half-wave cycle when the third time signal is greater than the first predetermined time; and a second timing module configured to receive the bus voltage, the first threshold voltage, and the second time signal, and output the second time signal when the rising edge of the bus voltage reaches the first threshold voltage.

Further, the second predetermined time is zero or a fixed time; and the second time signal remains stable when the third time signal is equal to the second predetermined time.

Further, the second storage module is configured to receive the bus voltage, the first threshold voltage, and the second threshold voltage, and generate and store the second time signal characterizing the time between the moment at which the rising edge of the bus voltage reaches the first threshold voltage and the moment at which the falling edge reaches the second threshold voltage during each power frequency half-wave cycle.

Further, the control signal generation module may include:

a pulse signal module configured to output a high-level pulse signal within a specified number N of power frequency half-wave cycles, where N≥1;

a second control signal module configured to receive the first threshold voltage and the second time signal to generate a second control signal; and a logic module configured to receive the pulse signal and the second control signal to generate the first control signal.

Further, the bleeder control circuit may include a first subtraction module configured to receive a second predetermined time, where the second predetermined time is a time for controlling the bleeder circuit to be turned on in advance.

Based on the above inventive purpose, the present disclosure further provides a bleeder circuit control method for controlling a bleeder circuit. The bleeder circuit is electrically connected to a bus of an LED driver circuit, and the method includes:

receiving a bus voltage and at least one threshold voltage and generating a first time signal characterizing a time between a moment at which a rising edge of the bus voltage reaches the threshold voltage and a moment at which a falling edge reaches the threshold voltage during each power frequency half-wave cycle;

starting from a second power frequency half-wave cycle, turning off the bleeder circuit for a second time when detecting that the rising edge of the bus voltage reaches the threshold voltage;

detecting a time between the moment at which the bleeder circuit is conducting again to the moment at which the falling edge of the bus voltage reaches the threshold voltage and generating a third time signal; and reconfiguring the second time in the next power frequency half-wave cycle based on the third time signal until the third time signal reaches a target value.

Further, at least one threshold voltage may include a first threshold voltage and a second threshold voltage, and a timing module generates the first time signal characterizing the time between the moment at which the rising edge of the bus voltage reaches the first threshold voltage and the moment at which the falling edge reaches the second threshold voltage.

Further, the second time is a difference between the first time signal generated in a previous power frequency half-wave cycle and a second predetermined time.

Further, the method may include:

comparing the third time signal with a first predetermined time and increasing the second time by a step in the next power frequency half-wave cycle when the third time signal is smaller than the first predetermined time and greater than the second predetermined time; and when the third time signal is greater than the first predetermined time, decreasing the second time by a step in the next power frequency half-wave cycle.

Further, the second predetermined time is zero or a fixed time, and the second time remains stable when the third time signal is equal to the second predetermined time.

Further, when the second predetermined time is a fixed time, the fixed time characterizes a time for turning on the bleeder circuit in advance.

Further, the first threshold voltage characterizes an over-zero detection threshold of the rising edge of the bus voltage, the second threshold voltage characterizes an over-zero detection threshold of the falling edge of the bus voltage, and the first threshold voltage is greater than the second threshold voltage.

Based on the above inventive purpose, the present disclosure further provides an LED driver circuit, including:

a dimmer configured to receive an AC power signal and phase-cut the AC power signal;

a rectifier module configured to rectify the AC power signal after phase-cutting, where an output lead of the rectifier module is a bus;

the bleeder control circuit described above configured to be electrically connected to the bus and output a control signal to control a bleeder circuit; and an LED driver module configured to be electrically connected to the bus and generate a drive current.

Based on the above inventive purpose, the present disclosure further provides an illumination device, including:

an LED load and the LED driver circuit described above that is configured to output a drive current to drive the LED load.

Compared with the prior art, the present disclosure accurately controls the bleeder circuit through the detection of the bus voltage and the adaptive control method to reduce consumption of the system by the bleeder current in the circuit and also eliminate the impact of the maintenance current in the circuit on the bus current phase detection, thereby improving the operational efficiency and stability of the system and eliminating dimming flicker.

Reference numerals: 100: trailing edge dimmer; 200: rectifier module; 210: bus; 300: bleeder current control circuit; 330: timing module; 331: first comparator; 332: second comparator; 340: time processing module; 341: first storage module; 342: first comparison module; 343: first processing module; 344: first timing module 345: second storage module; 346: second comparison module; 347: second processing module; 348: second timing module; 349: first subtraction module; 350: control signal generation module; 351: pulse signal module; 352: second signal module; 353: logic module; 400: LED driver unit; and 410: LED load.

DETAILED DESCRIPTION OF THE EMBODIMENTS

To make the objectives, technical solutions, and advantages of the present disclosure clear, the technical solutions in the embodiments of the present disclosure are clearly and completely described below with reference to the accompanying drawings in the embodiments of the present disclosure. The described embodiments are some, but not all, of the embodiments of the present disclosure. Embodiments of the present disclosure are described below with reference to the accompanying drawings.

Figure 7:
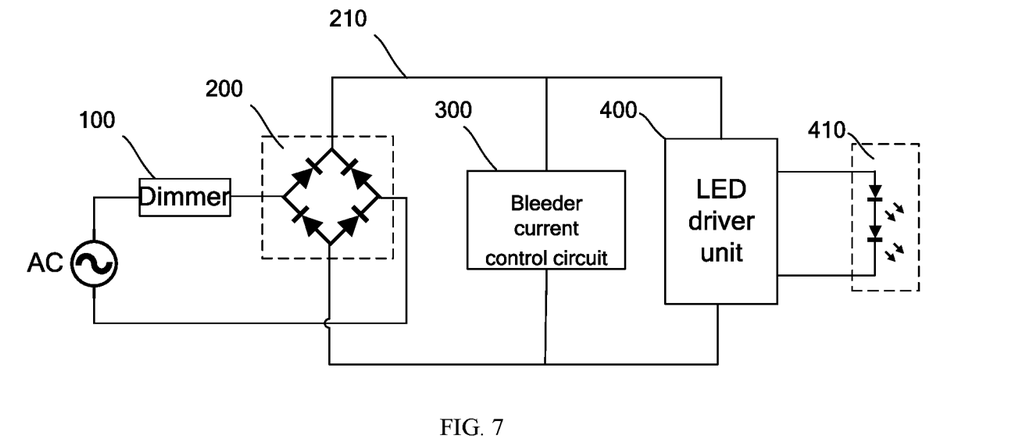
FIG. 7 is a block principle diagram of an LED driver circuit according to an embodiment of the present disclosure.

In an embodiment, as shown in FIG. 7, an LED driver circuit includes trailing edge dimmer 100 configured to receive an AC power signal and perform trailing edge chopping on the AC power signal; rectifier module 200 configured to rectify the AC power signal after trailing edge chopping and configure an output lead of the rectifier module 200 as the bus 210; bleeder current control circuit 300 electrically connected to the bus 210; and LED driver unit 400 configured to be electrically connected to the bus 210 and generate a drive current to drive the LED load 410.

Figure 1:
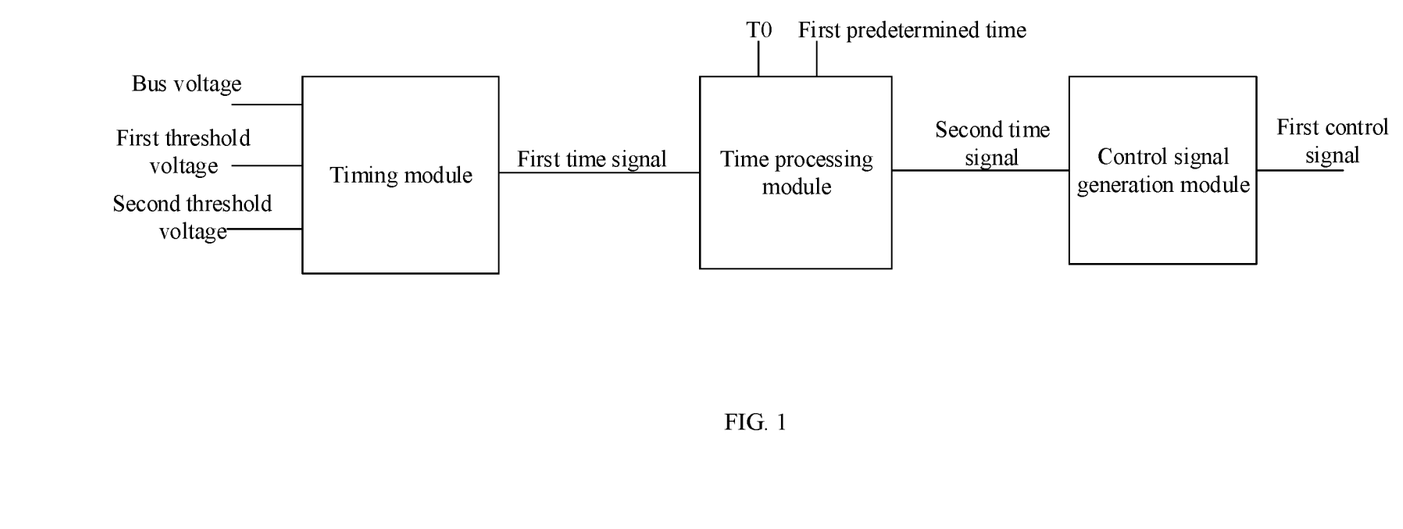
FIG. 1 is a block diagram showing a principle of operation of a bleeder circuit according to an embodiment of the present disclosure.
Figure 2:
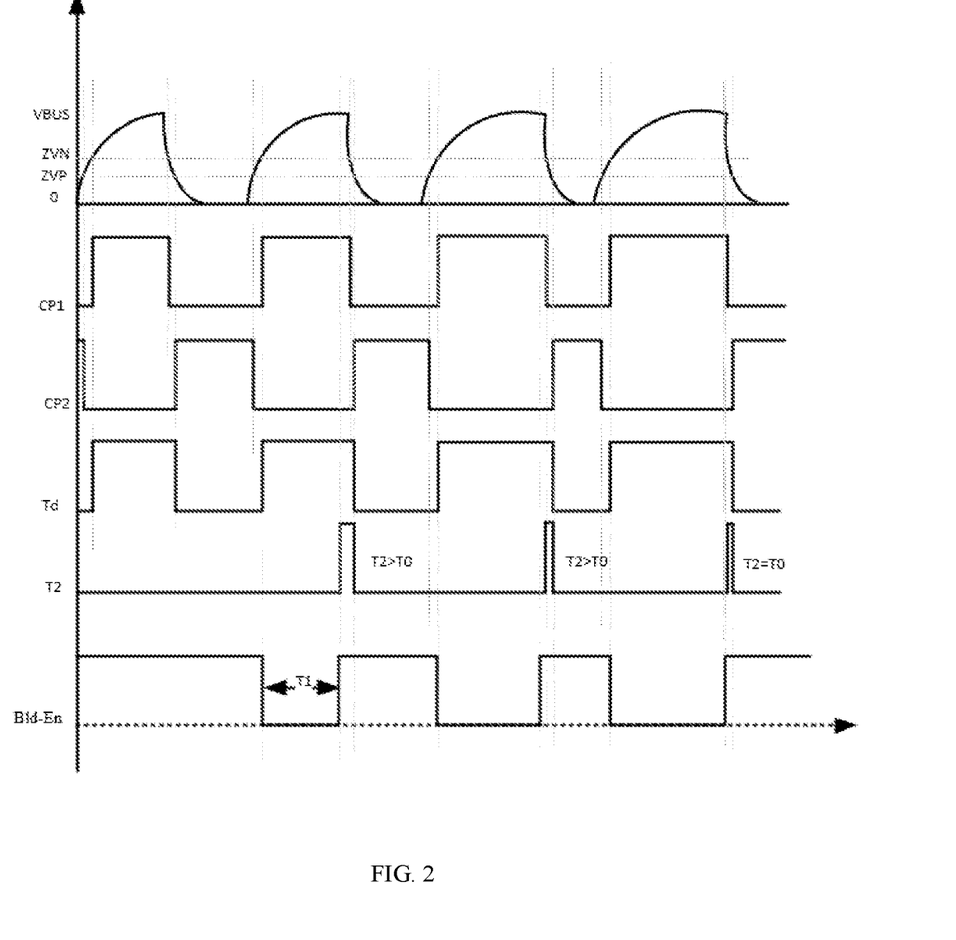
FIG. 2 is a waveform diagram of a circuit according to an embodiment of the present disclosure.

In an implementation, as shown in FIG. 1 and FIG. 2, the bleeder current control circuit 300 includes timing module 330, time processing module 340, and control signal generation module 350. The timing module 330 is configured to receive the bus voltage $V_{bus}$ and at least one threshold voltage and generate a first time signal $T_d$ characterizing the time between the moment at which a rising edge of the bus voltage $V_{bus}$ reaches the threshold voltage and the moment at which a falling edge reaches the threshold voltage during each power frequency half-wave cycle. The time processing module 340 is configured to receive the first time signal $T_d$ and generate a second time signal $T_{d'}$ based on the first time signal $T_d$ in a previous power frequency half-wave cycle. The control signal generation module 350 is configured to receive the second time signal $T_{d'}$ and generate a first control signal Bld-En for controlling the bleeder circuit.

In an implementation, the at least one threshold voltage may include a first threshold voltage ZVN and a second threshold voltage ZVP, and the timing module 330 generates the first time signal Td characterizing the time between the moment at which the rising edge of the bus voltage $V_{bus}$ reaches the first threshold voltage ZVN and the moment at which the falling edge reaches the second threshold voltage ZVP.

In an implementation, the time processing module 340 receives the first time signal $T_d$ to store as the second time signal $T_{d'}$, detects the bus voltage $V_{bus}$, and outputs the second time signal $T_{d'}$ when detecting that the bus voltage $V_{bus}$ reaches the first threshold voltage ZVN.

Figure 3:
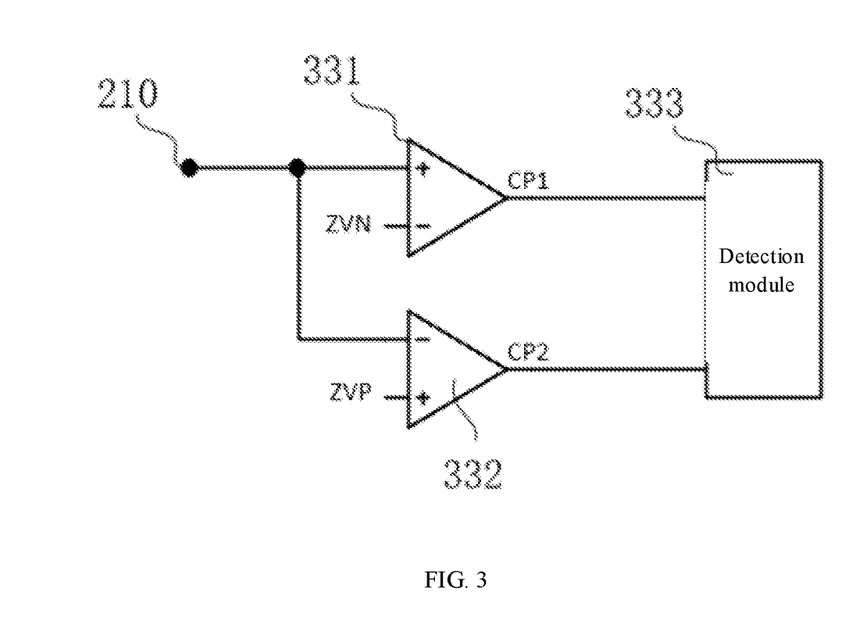
FIG. 3 is a circuit principle diagram of a timing module according to an embodiment of the present disclosure.

In an implementation, as shown in FIG. 3, the timing module 330 includes first comparator 331 configured to receive the bus voltage $V_{bus}$ and the first threshold voltage ZVN and output first signal CP1 when detecting that the rising edge of the bus voltage $V_{bus}$ reaches the first threshold voltage ZVN during each power frequency half-wave cycle; second comparator 332 configured to receive the bus voltage and the second threshold voltage and output second signal CP2 when detecting that the falling edge of the bus voltage reaches the second threshold voltage during each power frequency half-wave cycle; and detection module 333 configured to receive the first signal CP1 and the second signal CP2, detect a time between the first signal CP1 and second signal CP2 during each power frequency half-wave cycle, and generate the first time signal $T_d$. When the rising edge of the bus voltage $V_{bus}$ reaches the first threshold voltage ZVN, it characterizes that the dimmer 100 begins conducting. When the falling edge of the bus voltage $V_{bus}$ reaches the second threshold voltage ZVP, it characterizes that the dimmer 100 begins to turn off. Therefore, the first time signal $T_d$ is a continuous time signal recording the conduction time of the dimmer 100.

Figure 4:
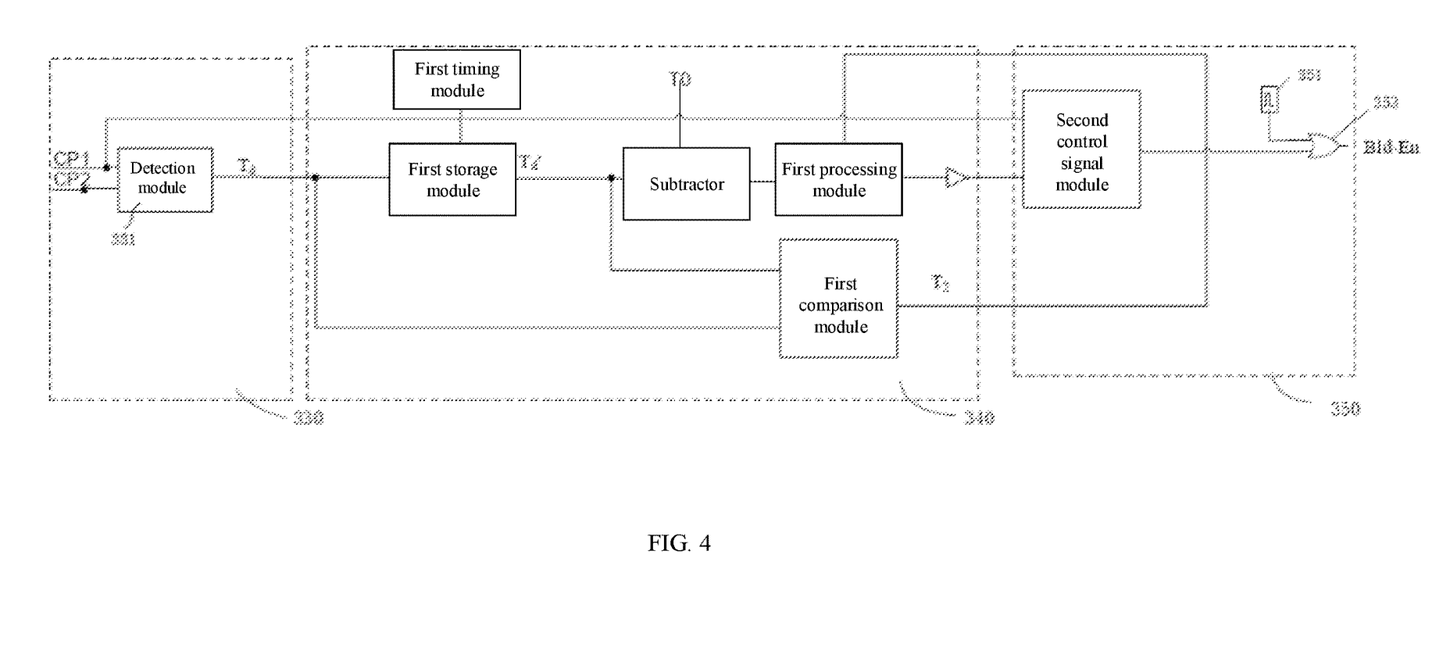
FIG. 4 is a module principle diagram of a bleeder circuit according to an embodiment of the present disclosure.

In an implementation, as shown in FIG. 4, the time processing module 340 includes first storage module 341, first comparison module 342, first processing module 343, and first timing module 344. The first storage module 341 is configured to receive the first time signal $T_d$ in the previous power frequency half-wave cycle to store as the second time signal $T_{d'}$. Therefore, the second time signal $T_d$ is obtained later than a power frequency half-wave cycle of the first time signal $T_d$. The first comparison module 342 is configured to receive the first time signal $T_d$ and the second time signal $T_{d'}$ in the same one power frequency half-wave cycle and output third signal $T_2$ when the first time signal $T_d$ is not equal to the second time signal $T_{d'}$. When the first time signal $T_d$ is not equal to the second time signal $T_{d'}$, it characterizes that the circuit is in an unstable state. The third signal $T_2$ is the difference between the first time signal $T_d$ and the second time signal $T_{d'}$. The first processing module 343 is configured to receive the third signal $T_2$ and increase the second time signal $T_{d'}$ by a step in the next power frequency half-wave cycle. The first processing module 343 increases the second time signal $T_{d'}$ by a step based on the third signal $T_2$. The first timing module 344 is configured to receive the bus voltage $V_{bus}$, the first threshold voltage ZVN and the second time signal $T_{d'}$ and output the second time signal $T_{d'}$ when the rising edge of the bus voltage reaches the first threshold voltage ZVN.

Figure 5:
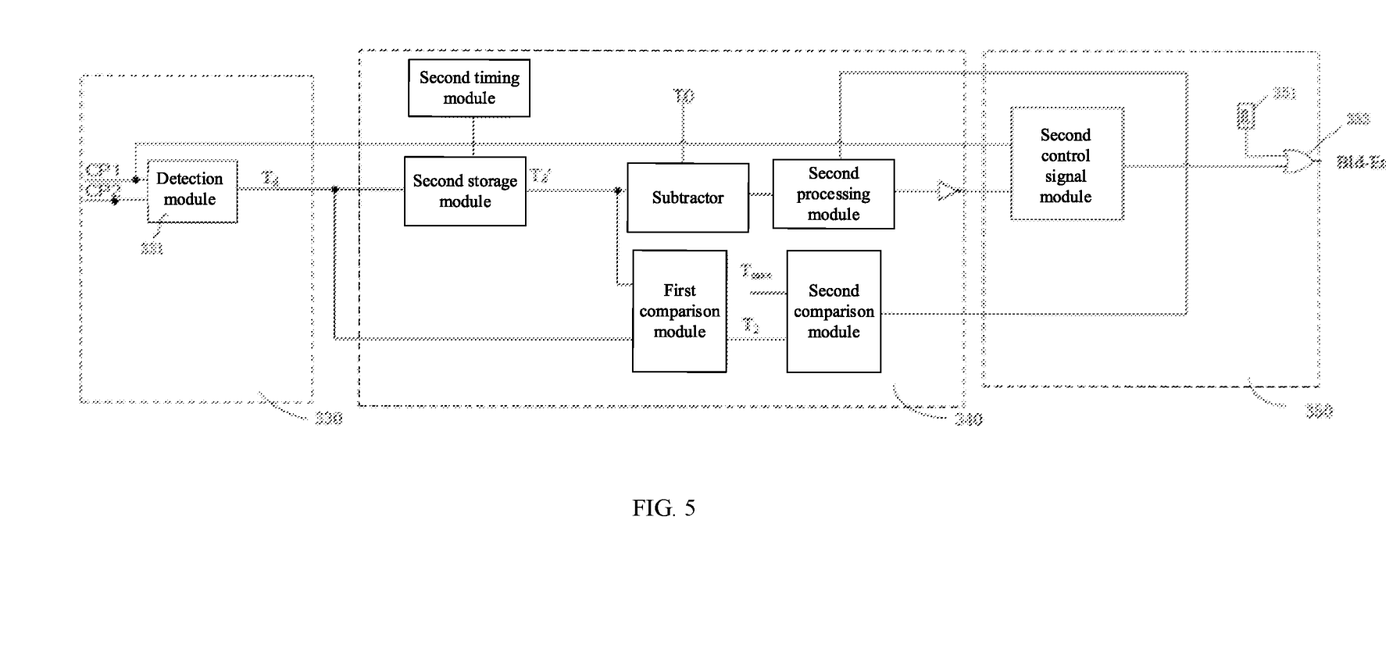
FIG. 5 is a module principle diagram of another bleeder circuit according to an embodiment of the present disclosure.

In an implementation, as shown in FIG. 5, the time processing module 340 includes second storage module 345, second comparison module 346, second processing module 347, and second timing module 348. The second storage module 345 is configured to receive the first time signal $T_d$ in the previous power frequency half-wave cycle to store as the second time signal $T_{d'}$. The second storage module 345 is configured to receive the bus voltage $V_{bus}$, the first threshold voltage ZVN, and the second threshold voltage ZVP and generate and store the second time signal $T_{d'}$ characterizing the time between the moment at which the rising edge of the bus voltage $V_{bus}$ reaches the first threshold voltage ZVN and the moment at which the falling edge reaches the second threshold voltage ZVP during each power frequency half-wave cycle. The second comparison module 346 is configured to receive the first time signal $T_d$ and the second time signal $T_{d'}$ in the same power frequency half-wave cycle and compare the first time signal $T_d$ with the second time signal $T_{d'}$ to obtain third time signal $T_2$, that is, $T_2 = T_d - T_{d'}$. The second processing module 347 is configured to receive the third time signal $T_2$ and compare the third time signal $T_2$ with a first predetermined time and increase the second time signal $T_{d'}$ by a step in the next power frequency half-wave cycle when the third time signal $T_2$ is smaller than the first predetermined time and greater than second predetermined time $T_0$, or decrease the second time signal $T_{d'}$ by a step in the next power frequency half-wave cycle when the third time signal $T_2$ is greater than the first predetermined time. The second timing module 348 is configured to receive the bus voltage $V_{bus}$, the first threshold voltage ZVN, and the second time signal $T_{d'}$ and output the second time signal $T_{d'}$ when the rising edge of the bus voltage $V_{bus}$ reaches the first threshold voltage ZVN. The second predetermined time $T_0$ is zero or a fixed time. The second time signal $T_{d'}$ remains stable when the third time signal $T_2$ is equal to the second predetermined time $T_0$.

In an implementation, the time processing module further includes first subtraction module 349 configured to receive the second predetermined time $T_0$, and the second predetermined time $T_0$ is a time for controlling the bleeder circuit to be turned on in advance.

In an implementation, the control signal generation module 350 includes pulse signal module 351, second control signal module 352, and logic module 353. The pulse signal module 351 is configured to output a high-level pulse signal within a specified number N of power frequency half-wave cycles, where N≥1. The second control signal module 352 is configured to receive the first signal CP1 and the second time signal $T_{d'}$ to generate a second control signal. The logic module 353 is configured to receive the pulse signal and the second control signal to generate the first control signal Bld-En, and the first control signal Bld-En is used to control the on/off of the bleeder circuit.

In the bleeder control circuit according to this embodiment, the conduction state of the dimmer 100 is determined by detecting the bus voltage, and a control signal for controlling the on/off of the bleeder circuit in the current power frequency half-wave cycle is generated based on a time signal characterizing a conduction state of the dimmer 100 in the previous power frequency half-wave cycle, thereby accurately controlling the bleeder circuit and improving the operational efficiency and system stability. In addition, the operational state of the circuit is determined based on a comparison result between the first time signal $T_d$ and the second time signal $T_{d'}$, and the control signal is corrected based on the working state of the circuit, such that the bleeder circuit and the bus circuit operate with better consistency and more accurate control is realized.

Figure 6:
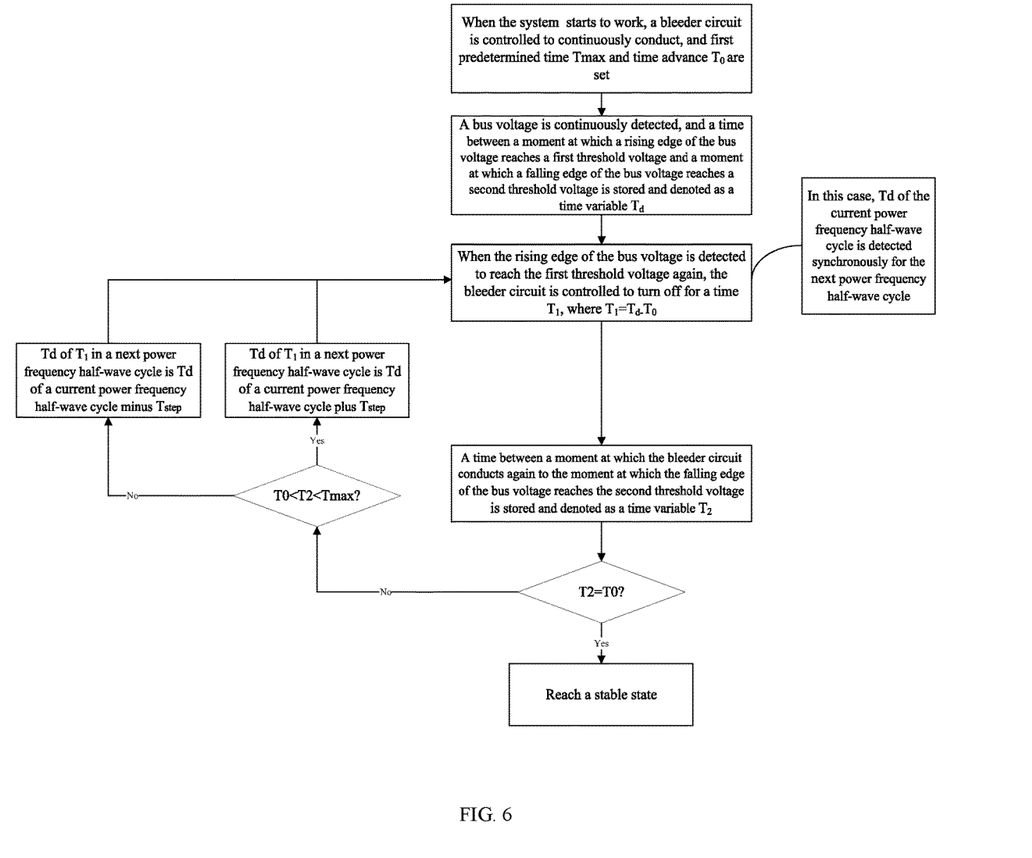
FIG. 6 is a flowchart of a bleeder circuit control method according to an embodiment of the present disclosure.

In an implementation, as shown in FIG. 6, the present disclosure further provides a bleeder circuit control method for controlling a bleeder circuit in an LED driver circuit. The bleeder circuit is electrically connected to a bus of the LED driver circuit, and the method includes:

A1: From the first power frequency half-wave cycle, first time signal $T_d$ characterizing the time between the moment at which a rising edge of bus voltage $V_{bus}$ reaches the first threshold voltage ZVN and the moment at which a falling edge of the bus voltage $V_{bus}$ reaches second threshold voltage ZVP is obtained. The bleeder circuit is controlled to continuously conducting in the first power frequency half-wave cycle to obtain the conduction time $T_d$ of the dimmer in the first power frequency half-wave cycle. When the rising edge of the bus voltage reaches the first threshold voltage ZVN, it characterizes that the dimmer begins conducting. When the falling edge of the bus voltage reaches the second threshold voltage ZVP, it characterizes that the dimmer is turned off. Therefore, the time variable $T_d$ is the conduction time of the dimmer in the current power frequency half-wave cycle.

A2: From at least the second power frequency half-wave cycle, when the rising edge of the bus voltage $V_{bus}$ is detected to reach the first threshold voltage ZVN, the bleeder circuit is turned off for second time $T_1$. The second time $T_1$ is the difference between the first time signal $T_d$ generated in a previous power frequency half-wave cycle and second predetermined time $T_0$. When the rising edge of the bus voltage $V_{bus}$ reaches the first threshold voltage ZVN, it characterizes that the dimmer begins conducting. In this case, the bleeder circuit is controlled to turn off to reduce power consumption.

A3: After the time $T_1$, the bleeder circuit is being conducting again, and a time between the moment at which the bleeder circuit is being conducting again and the moment at which the falling edge of the bus voltage reaches the second threshold voltage ZVP is obtained to generate third time signal $T_2$. The bleeder circuit needs to be turned on when the dimmer is turned off to quickly release a load and a residual current in the bus circuit, and the bleeder circuit is turned off when the dimmer is turned on to reduce power consumption. Therefore, the conduction time $T_d$ of the dimmer detected in the previous power frequency half-wave cycle minus the second predetermined time $T_0$ (that is, $T_d - T_0$) is used as the time $T_1$ that the bleeder circuit needs to be turned off in the current power frequency half-wave cycle. The second predetermined time $T_0$ is set by the data processing module 340 to ensure that the bleeder circuit is already turned on when the dimmer is turned off and mainly to offset the response delay of the electronic device in the system and turn on the bleeder circuit in advance when the dimmer is turned off.

A4: The second time $T_1$ in the next power frequency half-wave cycle is reset based on the third time signal $T_2$, until the third time signal reaches a target value, that is, until $T_2 = T_0$. The second time $T_1$ is configured as follows: If $T_2 \neq T_0$ and $T_{max} > T_2 > T_0$, then $T_1 = T_d + T_{step}$; if $T_2 \neq T_0$ and $T_{max} < T_2$, the $T_1 = T_d - T_{step}$; if $T_2 = T_0$, it characterizes that the system reaches a stable state, and there is no need to reset $T_1$. $T_{max}$ is a first predetermined time and $T_{step}$ is a preset step time.

The conduction time of the bleeder circuit can be measured by detecting the rising edge of the first control signal Bld-En, the time $T_2$ between the moment at which the rising edge of the first control signal Bld-En occurs and the moment at which the falling edge of the bus voltage $V_{bus}$ reaches the second threshold voltage ZVP is a time between turning on the bleeder circuit and turning off the dimmer, that is, the third time signal $T_2$ is a time for turning on the bleeder circuit in advance in the current power frequency half-wave cycle. If the third time signal $T_2$ is not equal to the second predetermined time $T_0$, it characterizes that there is an error when data of the previous power frequency half-wave cycle is used to control the operation of the circuit in the current power frequency half-wave cycle. The error needs to be fed back for the second time $T_1$ of the current power frequency half-wave cycle, and then the corrected $T_1$ is used to control the on/off of the bleeder circuit in the next power frequency half-wave cycle, such that the bleeder circuit in the next power frequency half-wave cycle is extended or shortened by time $T_{step}$. The system enters the stable state after error correction in a plurality of power frequency half-wave cycles, that is, $T_2=T_0$. In this case, the error is zero, and the bleeder circuit can be accurately controlled by repeating and synchronizing steps A1 to A3.

In summary, in the bleeder current control circuit according to the present disclosure, the conduction state of the trailing edge dimmer is determined by detecting the bus voltage, the specific conduction time of the trailing edge dimmer is measured through a counter, and then the conduction time of the trailing edge dimmer in the previous power frequency half-wave cycle is corrected (minus the second predetermined time $T_0$) to generate a control signal for controlling the conduction time of the bleeder circuit in the next power frequency half-wave cycle. The error feedback for $T_2$ and error compensation are used to achieve adaptive control on the bleeder circuit, thereby accurately controlling the bleeder circuit, effectively improving the operational efficiency of the circuit, and preventing flicker caused by work timing mismatch of the bleeder circuit and the dimmer.

The technical solutions of the present disclosure are described with reference to the accompanying drawings. It should be noted that these descriptions are merely intended to explain the technical solutions of the present disclosure and may not be construed as limiting the protection scope of the present disclosure in any way. Therefore, those skilled in the art may derive other specific implementations of the present disclosure without creative effort, but these implementations should fall within the protection scope of the present disclosure.

What is claimed is:

1. A bleeder control circuit, wherein an alternating current (AC) input voltage is transmitted to a bus line after a phase-cut processing, and the bleeder control circuit comprises:
   a timing module configured to receive a bus voltage and at least one threshold voltage, and generate a first time signal characterizing the time between the moment at which a rising edge of the bus voltage reaches the threshold voltage and the moment at which a falling edge of the bus voltage reaches the threshold voltage during each power frequency half-wave cycle;
   a time processing module configured to receive the first time signal and generate a second time signal based on the first time signal in a previous power frequency half-wave cycle; and
   a control signal generation module configured to receive the second time signal and generate a first control signal for controlling a bleeder circuit,
   wherein the at least one threshold voltage comprises a first threshold voltage and a second threshold voltage, and the timing module generates the first time signal characterizing the time between the moment at which the rising edge of the bus voltage reaches the first threshold voltage and the moment at which the falling edge of the bus voltage reaches the second threshold voltage.

2. The bleeder control circuit according to claim 1, wherein the time processing module is configured to receive the first time signal to store as the second time signal, detect the bus voltage, and output the second time signal when detecting that the bus voltage reaches the threshold voltage.

3. The bleeder control circuit according to claim 1, wherein the timing module comprises:
   a first comparator configured to receive the bus voltage and the first threshold voltage and output a first signal when detecting that the rising edge of the bus voltage reaches the first threshold voltage during each power frequency half-wave cycle;
   a second comparator configured to receive the bus voltage and the second threshold voltage and output a second signal when detecting that the falling edge of the bus voltage reaches the second threshold voltage during each power frequency half-wave cycle; and
   a detection module configured to receive the first signal and the second signal, detect the time between the first signal and the second signal during each power frequency half-wave cycle, and generate the first time signal.

4. The bleeder control circuit according to claim 1, wherein the time processing module comprises:
   a first storage module configured to receive the first time signal in the previous power frequency half-wave cycle to store as the second time signal;
   a first comparison module configured to receive the first time signal and the second time signal in one power frequency half-wave cycle and output a third signal when the first time signal is not equal to the second time signal;
   a first processing module configured to receive the third signal and increase the second time signal by a step in a next power frequency half-wave cycle; and
   a first timing module configured to receive the bus voltage, the first threshold voltage and the second time signal, and output the second time signal when the rising edge of the bus voltage reaches the first threshold voltage.

5. The bleeder control circuit according to claim 1, wherein the time processing module comprises:
   a second storage module configured to receive the first time signal in the previous power frequency half-wave cycle to store as the second time signal;
   a second comparison module configured to receive the first time signal and the second time signal in the same one power frequency half-wave cycle and compare the first time signal with the second time signal to obtain a third time signal;
   a second processing module configured to receive the third time signal and compare the third time signal with a first predetermined time and increase the second time signal by a step in a next power frequency half-wave cycle when the third time signal is smaller than the first predetermined time and greater than a second predetermined time or decrease the second time signal by a step in the next power frequency half-wave cycle when the third time signal is greater than the first predetermined time; and
   a second timing module configured to receive the bus voltage, the first threshold voltage and the second time signal, and output the second time signal when the rising edge of the bus voltage reaches the first threshold voltage.

6. The bleeder control circuit according to claim 5, wherein the second predetermined time is zero or a fixed time; and
the second time signal remains stable when the third time signal is equal to the second predetermined time.

7. The bleeder control circuit according to claim 5, wherein the second storage module is configured to receive the bus voltage, the first threshold voltage and the second threshold voltage, and generate and store the second time signal characterizing the time between the moment at which the rising edge of the bus voltage reaches the first threshold voltage and the moment at which the falling edge of the bus voltage reaches the second threshold voltage during each power frequency half-wave cycle.

8. The bleeder control circuit according to claim 5, wherein the second storage module is configured to receive the bus voltage, the first threshold voltage and the second threshold voltage, and generate and store the second time signal characterizing the time between the moment at which the rising edge of the bus voltage reaches the first threshold voltage and the moment at which the falling edge of the bus voltage reaches the second threshold voltage during each power frequency half-wave cycle.

9. The bleeder control circuit according to claim 1, wherein the control signal generation module comprises:
   a pulse signal module configured to output a high-level pulse signal within a specified number N of power frequency half-wave cycles, wherein N≥1;
   a second control signal module configured to receive the first threshold voltage and the second time signal to generate a second control signal; and
   a logic module configured to receive the pulse signal and the second control signal to generate the first control.

10. The bleeder control circuit according to claim 1, further comprising a first subtraction module configured to receive a second predetermined time, wherein the second predetermined time is a time for controlling the bleeder circuit to be turned on in advance.

11. A light-emitting diode (LED) driver circuit, comprising:
   a dimmer configured to receive an alternating current (AC) power signal and phase-cut the AC power signal to obtain a phase-cut AC power signal;
   a rectifier module configured to rectify the phase-cut AC power signal, wherein an output lead of the rectifier module is a bus;
   the bleeder control circuit according to claim 1, configured to be electrically connected to the bus and output a control signal to control the bleeder circuit; and
   an LED driver module configured to be electrically connected to the bus and generate a drive current.

12. An illumination device, comprising:
   a light-emitting diode (LED) load; and
   the LED driver circuit according to claim 11 configured to output the drive current to drive the LED load.

13. A bleeder circuit control method for controlling a bleeder circuit, wherein the bleeder circuit is electrically connected to a bus of a light-emitting diode (LED) driver circuit, and the method comprises:
   receiving a bus voltage and at least one threshold voltage and generating a first time signal characterizing the time between the moment at which a rising edge of the bus voltage reaches the threshold voltage and the moment at which a falling edge of the bus voltage reaches the threshold voltage during each power frequency half-wave cycle;
   starting from a second power frequency half-wave cycle, turning off the bleeder circuit for a second time when detecting that the rising edge of the bus voltage reaches the threshold voltage;
   detecting the time between the moment at which the bleeder circuit is conducting again to the moment at which the falling edge of the bus voltage reaches the threshold voltage, and generating a third time signal; and
   reconfiguring the second time in a next power frequency half-wave cycle based on the third time signal until the third time signal reaches a target value.

14. The bleeder circuit control method according to claim 13, wherein the at least one threshold voltage comprises a first threshold voltage and a second threshold voltage, and a timing module generates the first time signal characterizing the time between the moment at which the rising edge of the bus voltage reaches the first threshold voltage and the moment at which the falling edge of the bus voltage reaches the second threshold voltage.

15. The bleeder circuit control method according to claim 14, wherein the first threshold voltage characterizes an over-zero detection threshold of the rising edge of the bus voltage, the second threshold voltage characterizes an over-zero detection threshold of the falling edge of the bus voltage, and the first threshold voltage is greater than the second threshold voltage.

16. The bleeder circuit control method according to claim 13, wherein the second time is a difference between the first time signal generated in a previous power frequency half-wave cycle and a second predetermined time.

17. The bleeder circuit control method according to claim 16, further comprising:
   comparing the third time signal with a first predetermined time and increasing the second time by a step in a next power frequency half-wave cycle when the third time signal is smaller than the first predetermined time and greater than the second predetermined time; and
   when the third time signal is greater than the first predetermined time, decreasing the second time by a step in the next power frequency half-wave cycle.

18. The bleeder circuit control method according to claim 16, wherein
   the second predetermined time is zero or a fixed time; and
   the second time remains stable when the third time signal is equal to the second predetermined time.

19. The bleeder circuit control method according to claim 16, wherein when the second predetermined time is a fixed time, the fixed time characterizes a time for turning on the bleeder circuit in advance.

* * * * *